No. 664,795. Patented Dec. 25, 1900.
C. G. WARNECKE & W. H. HEATH.
MAGAZINE PLATE HOLDER.
(Application filed July 31, 1900.)

(No Model.) 3 Sheets—Sheet 1.

Witnesses INVENTORS.

No. 664,795. Patented Dec. 25, 1900.
C. G. WARNECKE & W. H. HEATH.
MAGAZINE PLATE HOLDER.
(Application filed July 31, 1900.)
(No Model.) 3 Sheets—Sheet 3.

INVENTORS.
Christian Gustav Warnecke
William Henry Heath

UNITED STATES PATENT OFFICE.

CHRISTIAN GUSTAV WARNECKE AND WILLIAM HENRY HEATH, OF LONDON, ENGLAND.

MAGAZINE PLATE-HOLDER.

SPECIFICATION forming part of Letters Patent No. 664,795, dated December 25, 1900.

Application filed July 31, 1900. Serial No. 25,430. (No model.)

*To all whom it may concern:*

Be it known that we, CHRISTIAN GUSTAV WARNECKE, engineer, a subject of the Emperor of Germany, and a resident of 453 Northampton Buildings, Clerkenwell, London, and WILLIAM HENRY HEATH, carpenter, a subject of the Queen of Great Britain and Ireland, and a resident of 101 Northampton Buildings, Clerkenwell, London, in the county of Middlesex, England, have invented certain new and useful Improvements in Means for Exposing and Changing Plates or Films in Photographic Cameras, (for which we have made application in Great Britain, No. 12, dated January 1, 1900,) of which the following is a specification.

Our invention relates to means for exposing and changing plates or films in photographic cameras.

The accompanying three sheets of drawings, to which we will refer in the following description, clearly illustrate our invention.

Figure 1:
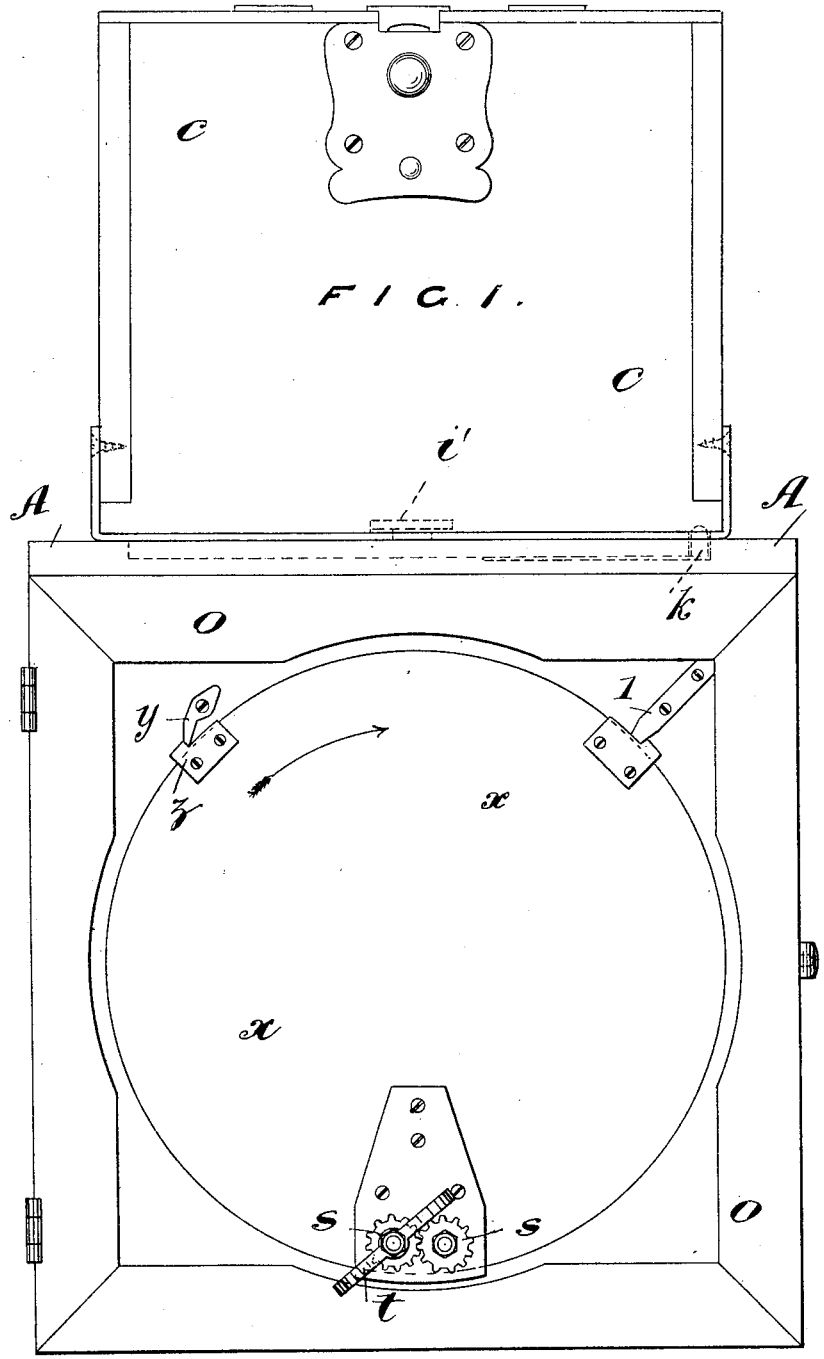
Figure 2:
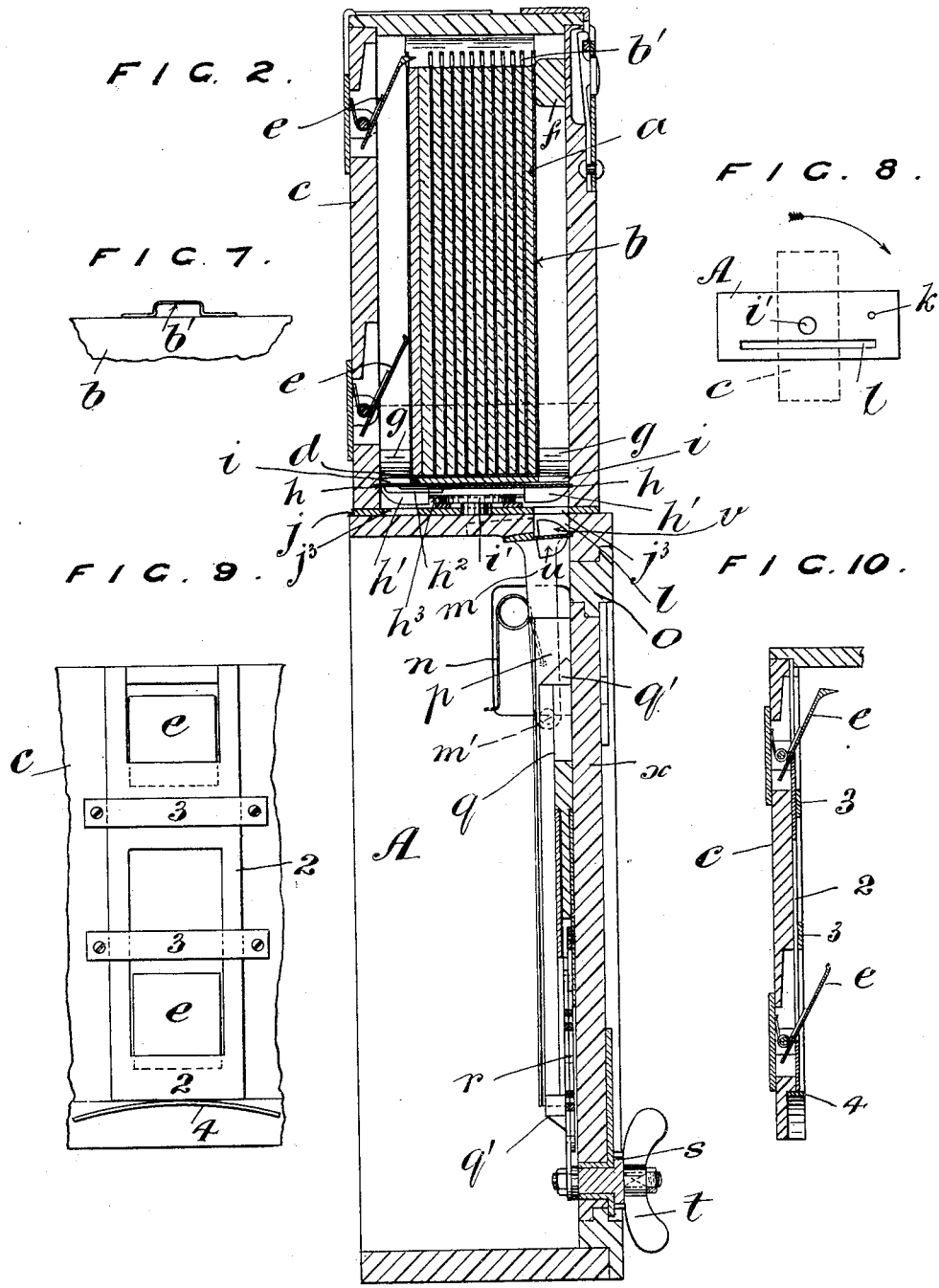
Figure 3:
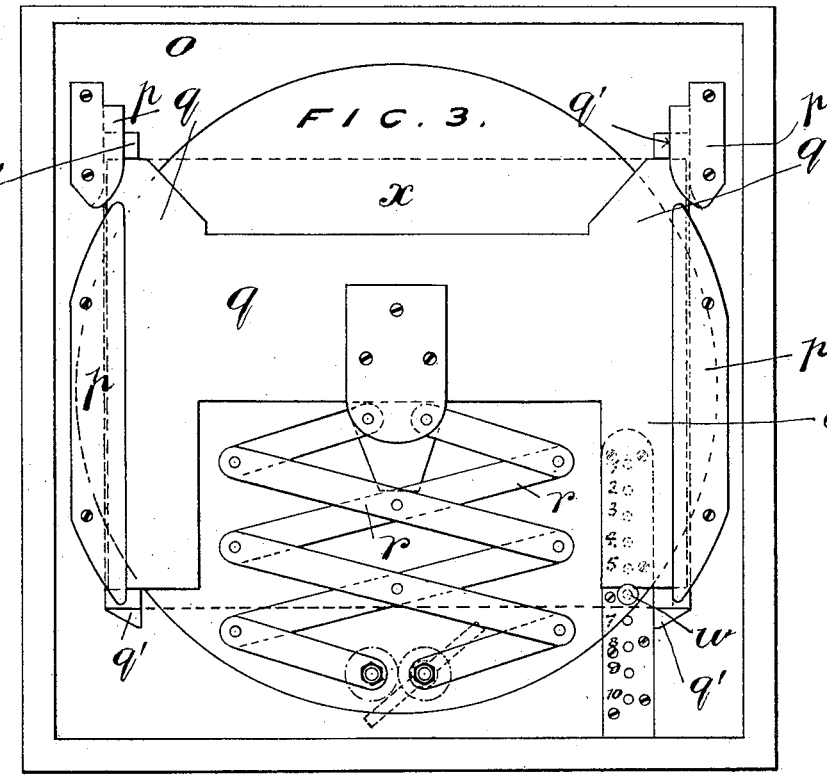
Figure 4:
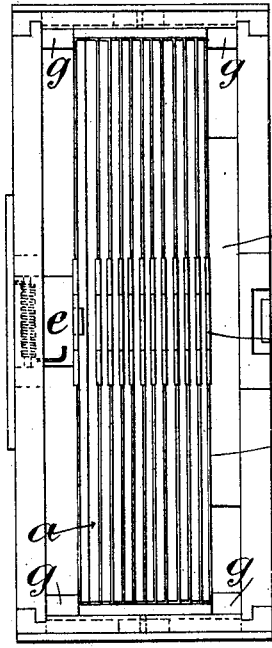
Figure 5:
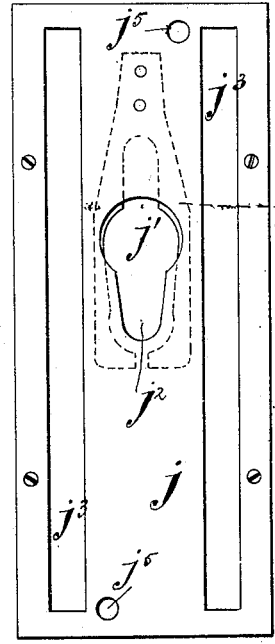
Figure 6:
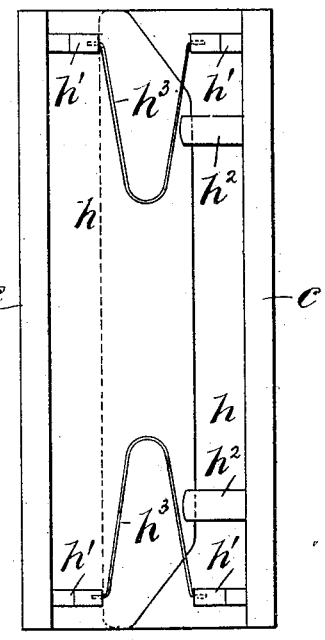

Figure 1 is an end elevation of a camera with our invention applied. Fig. 2 is a cross-sectional elevation. Fig. 3 is a front view of a portion of the mechanism. Fig. 4 is a plan view of the changing-box for the plates or films with the cover or lid removed. Fig. 5 is a plan view of the bottom of the changing-box. Fig. 6 is a plan view of the bottom of the changing-box with the bottom slotted plate removed. Figs. 7 to 10 are detail views.

Under our invention the plates or films $a$ are carried in sheaths $b$, and any convenient number—say twelve—are arranged within a changing-box $c$. Each sheath $b$ is provided centrally at the top with a hasp $b'$ (see Fig. 7) for the purpose to be hereinafter explained. The sheaths $b$, containing the plates, rest upon a base-plate $d$ and are maintained in position by means of springs $e\ e$ being thrust against a central stop $f$ at the top and confined between spring-stops $g$ at the bottom. Below the base-plate $d$, on which the sheaths $b$ rest, are two slidable shutters $h\ h$ to prevent egress of light into the box $c$ through the slots $i\ i$. The slidable shutters $h$ are shown more clearly in the plan view, Fig. 6. Each shutter $h$ is provided with inclined snugs $h'$, one shutter sliding upon the other in guides $h^2$ against the resistance of springs $h^3$.

In the drawings the changing-box is shown mounted upon a camera-back A, to which may be connected the usual extensible bellows, or the back A may be the rear end of an ordinary hand-camera. To temporarily fix the changing-box $c$ upon the camera A, we provide the camera with a headed stud $i'$. The changing-box $c$ carries a bottom plate $j$ with slots $j^3$. (Shown more clearly in the plan view, Fig. 5.) The plate $j$ is bored out at $j'$ to pass the stud $i$, the box $c$ being then slid until the stud occupies the end of the slot $j^2$, while a spring $j^4$, secured to the plate $j$, grips the stud $i$. When placed in position, a snap-spring $k$ (see Fig. 1) occupies one of the holes $j^5$ in the plate. The top of the camera-back A is slotted at $l$, as also shown in the diagram Fig. 8, this slot being normally closed by means of a shutter $m$, hinged at $m'$ and maintained in position by means of a spring $n$. The camera-back A is provided with a hinged door $o$, having guides $p$, within which slide a carrier $q$. (More clearly shown in the face view, Fig. 3.)

To the carrier $q$ is secured a system of hinged levers or "lazy-tongs" $r$, which, by means of pinions $s$ and a wing-nut $t$, Fig. 1, can be extended or collapsed as desired, and the carrier $q$ is provided with inclined snugs $q'$.

The action of the mechanism is as follows: The changing-box $c$ is placed in position upon the top of the camera-back, as shown in Figs. 1 and 2. The door $o$ of the camera is opened and a focusing-screen is introduced, so as to be in the correct register the plates occupy during exposure. The focusing being effected, the focusing-screen is withdrawn and the door $o$ closed. By operating the wing-nut $t$ the lazy-tongs $r$ are extended, thrusting upward the carrier $q$. In its upward passage the inclined snugs $q'$ at the top of the carrier $q$ come into contact with snugs $u$ at each end of the shutter $m$, turning the shutter on its pivot $m'$ and permitting the carrier $q$ to pass through the slot $l$ in the camera-top. The wood of the camera is cut away where shown in dotted lines to permit snugs $v$ to pass, which snugs are arranged at each end of and on the top of the shutter $m$. The carrier $q$ in its further progress passes through the slots $j^3$ in the plate $j$, and by means of the inclined snugs $q'$, engaging with the snugs $h'$, thrusts inward the shutter $h$. Then the spring-stops $g$ are moved outward by the carrier $q$, the wood of the box $c$ being cut away to permit of this, so that the carrier $q$ can be thrust upward within the changing-box $c$, occupying the space behind the sheaths $b$. The sheath $b$ next to the carrier $q$ is thrust by the pressure of the springs $e\ e$ into the carrier between the snugs $q'$, as shown in dotted lines in Fig. 3. By reversing the direction of rotation of the wing-nut $t$ the lazy-tongs $r$ are collapsed, bringing down the carrier $q$ with the sheath $b$. The shutter $m$ having been closed behind the carrier $q$ by means of the spring $n$, the bottom snugs $q'$ come into contact with the upper snugs $v$ of the shutter $m$ and turn it on its pivot to permit of the descent of the carrier $q$, the various springs then returning the shutters $m\ h$ and spring-stops $g$ to their normal position. The plate in the sheath $b$ can then be exposed. When this has been effected, the changing-box $c$ is rotated, as shown by the arrow, Fig. 8, to bring the front of the box to the rear. The carrier $q$ is then thrust upward in the changing-box $c$, as before described, until the upper spring $e$ engages the hasp $b'$, so as to retain the sheath and enable the carrier $q$ to be withdrawn from the box $c$ empty. The box $c$ can then be again rotated to be in readiness for the removal and exposure of another plate, as shown in Fig. 2. As shown in the drawings, the camera-back is square, so that a square focusing-screen may be employed. The operator may expose the rectangular plate on the image contained in the upper, middle, or lower portions of the square, according to his taste, by means of the screw $w$, Fig. 3, upon which the carrier rests, the screw being removable and adapted to screw into any of the tapped holes, (marked 1 to 10.) The camera-back is formed with a turn-table $x$, maintained in position by a pivoted catch $y$, Fig. 1.

If it is desired to expose the plate vertically instead of horizontally, the catch $y$ is removed to permit the turn-table being rotated a quarter of a revolution in the direction of the arrow, Fig. 1, until the plate $z$ bears against the stop $l$. The turn-table may be dispensed with in hand-cameras or in cameras which are turned bodily to effect a reversal of the plate from a horizontal to a vertical position.

To facilitate the withdrawal of the exposed plates and the reloading of the changing-box, we adopt means to automatically withdraw the springs $e\ e$ from contact with the sheaths. A method whereby this may be effected is shown in Figs. 9 and 10. We recess the wood of the box $c$ to accommodate a double yoke 2, which bears against the springs $e\ e$, the yoke 2 being maintained in position by strips 3 3. The lid of the box $c$ bears upon the top of the yoke 2, thrusting it downward against the action of a strong curved spring 4. When the box-lid is opened to remove the exposed plates and renew the supply, the pressure of the strong spring 4 thrusts up the yoke, which overcomes the resistance of the springs $e\ e$ and presses them against the side of the box $c$, so that they offer no obstruction to removing and replacing the sheaths $b$.

Our improved means for exposing and changing plates or films is particularly useful in three-color photography, as successive exposures can be readily made without altering the position of the camera. The sheaths in this case would be provided alternately with red, blue, and green glasses, through which the light would filter to a film or plate behind the colored glass.

We declare that what we claim is—

1. In combination with a camera having a reciprocating carrier and an opening for the passage of the same with a closing-shutter automatically actuated by the movement of the carrier, a box or receptacle reversibly connected to said camera and having openings adapted to aline with said opening in the camera, and shutters for said openings operated automatically by the movement of the carrier, substantially as described.

2. A changing-box adapted to contain a number of sheaths for plates or films, with means for maintaining the sheaths in position within the box, sliding light-tight shutters to provide for the ingress and egress of a carrier for removing and replacing the sheaths and means for removing the springs from contact with the sheaths on opening the lid of the box all arranged substantially as described.

In witness whereof we have hereunto set our hands in presence of two witnesses.

CHRISTIAN GUSTAV WARNECKE.
WILLIAM HENRY HEATH.

Witnesses:
FRANCIS W. FINN,
ERNEST COLLIER DUCHESNE.